US010727554B2

(12) United States Patent
Oya

(10) Patent No.: US 10,727,554 B2
(45) Date of Patent: Jul. 28, 2020

(54) FUEL CELL SYSTEM

(71) Applicant: TOYOTA JIDOSHA KABUSHIKI KAISHA, Toyota-shi, Aichi-ken (JP)

(72) Inventor: Ryosuke Oya, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 251 days.

(21) Appl. No.: 15/892,656

(22) Filed: Feb. 9, 2018

(65) Prior Publication Data

US 2018/0233793 A1 Aug. 16, 2018

(30) Foreign Application Priority Data

Feb. 16, 2017 (JP) ................... 2017-027033

(51) Int. Cl.
| | |
|---|---|
| *H01M 16/00* | (2006.01) |
| *B60L 58/40* | (2019.01) |
| *H01M 8/04302* | (2016.01) |
| *H01M 8/04303* | (2016.01) |
| *H01M 8/04537* | (2016.01) |
| *H01M 8/04664* | (2016.01) |
| *H01M 8/04955* | (2016.01) |
| *H01M 10/42* | (2006.01) |

(52) U.S. Cl.
CPC .......... *H01M 16/006* (2013.01); *B60L 58/40* (2019.02); *H01M 8/04302* (2016.02); *H01M 8/04303* (2016.02); *H01M 8/04567* (2013.01); *H01M 8/04686* (2013.01); *H01M 8/04955* (2013.01); *H01M 10/425* (2013.01); *B60L 2240/527* (2013.01); *B60L 2240/547* (2013.01); *H01M 2010/4271* (2013.01); *H01M 2220/20* (2013.01); *H01M 2250/20* (2013.01); *Y02T 90/32* (2013.01); *Y02T 90/34* (2013.01)

(58) Field of Classification Search
CPC ......... H01M 8/04302; H01M 8/04303; H01M 8/04567; H01M 8/04686; H01M 8/04955; H01M 16/006; H01M 10/425; H01M 2010/4271; H01M 2220/20; H01M 2250/20; B60L 58/40; B60L 2240/527; B60L 2240/547; Y02T 90/32; Y02T 90/34
See application file for complete search history.

(56) References Cited

U.S. PATENT DOCUMENTS

| | | | | |
|---|---|---|---|---|
| 2008/0290831 | A1* | 11/2008 | Hu | H01M 8/04559 320/101 |
| 2010/0332060 | A1* | 12/2010 | Bae | B60L 58/40 701/22 |
| 2015/0217660 | A1 | 8/2015 | Manabe et al. | |

FOREIGN PATENT DOCUMENTS

| | | |
|---|---|---|
| JP | 2010-277793 | 12/2010 |
| WO | WO 2014/013606 A1 | 1/2014 |

OTHER PUBLICATIONS

EPO website (www.espacenet.com) machine translation of the detailed description of JP 2010-277793A. (Year: 2010).*

* cited by examiner

*Primary Examiner* — Gregg Cantelmo
(74) *Attorney, Agent, or Firm* — Finnegan, Henderson, Farabow, Garrett & Dunner, LLP

(57) ABSTRACT

When an overvoltage is generated in one converter and an overvoltage is not generated in another converter, the whole system continues to operate using a power source connected to the other converter. Here, it is determined whether a reason for an overvoltage is an open-circuit fault in a relay connecting the two converters or a fault in an overvoltage detecting circuit of one converter, and system control suitable for the fault is performed.

5 Claims, 4 Drawing Sheets

| | OVERVOLTAGE DETERMINATION TYPE | | |
|---|---|---|---|
| | Type1 | Type2 | Type3 |
| FUEL CELL OVERVOLTAGE DETECTING CIRCUIT | ○ | ○ | ○ |
| BATTERY OVERVOLTAGE DETECTING CIRCUIT | × | × | ○ |
| VOLTAGE SENSOR OF FUEL CELL CONVERTER | × | ○ | — |
| SYNTHESIZED DETERMINATION | FAULT IN FUEL CELL OVERVOLTAGE DETECTING CIRCUIT (OVERVOLTAGE IS NOT ACTUALLY GENERATED) → OPERATION OF SYSTEM IS CONTINUOUSLY PERFORMED WITH FUEL CELL OVERVOLTAGE DETECTING CIRCUIT INVALIDATED | OPEN-CIRCUIT FAULT OF RELAY (OVERVOLTAGE IS ACTUALLY GENERATED) → OPERATION OF SYSTEM IS CONTINUOUSLY PERFORMED USING ONLY BATTERY AS POWER SOURCE | NORMAL CONNECTION OF RELAY (OVERVOLTAGE IS ACTUALLY GENERATED) → OPERATION OF SYSTEM IS STOPPED UNTIL OVERVOLTAGE IS RELEASED |

○ OVERVOLTAGE
× NO OVERVOLTAGE

FUEL CELL SYSTEM

INCORPORATION BY REFERENCE

The disclosure of Japanese Patent Application No. 2017-027033 filed on Feb. 16, 2017 including the specification, drawings and abstract is incorporated herein by reference in its entirety.

BACKGROUND

1. Technical Field

The disclosure relates to a fuel cell system including a fuel cell and a battery as power sources.

2. Description of Related Art

As fuel cell systems which are mounted in vehicles or the like, various fuel cell systems including a fuel cell and a battery as power sources to cope with a sudden variation of a load beyond the power generation capacity of the fuel cell have been proposed.

In such a fuel cell system, for example, when any one system element such as a driving motor that is supplied with electric power from the fuel cell and the battery or an inverter that controls the driving motor has a fault, imbalance of an output is caused. Therefore, a system employing a function of causing individual system elements to independently perform detection of a fault or stopping for the purpose of self-protection (fail-safe) has been proposed to prevent imbalance of an output. However, in a system employing such a function, there is a likelihood that a so-called concurrent fault in which another system element also has a fault due to a fault of a certain system element will be caused.

As a countermeasure against a concurrent fault, for example, the following technique is disclosed in WO2014/013606. In a system including a converter for a fuel cell (hereinafter referred to as a "fuel-cell converter"), a converter for a battery (hereinafter referred to as a "battery converter"), and an inverter that is disposed between the fuel-cell converter and a load, and this inverter is also disposed between the battery converter and the load, fault information is transmitted between a first controller that detects a fault of the fuel-cell converter and a second controller that detects a fault of the battery converter and the inverter. When any one of the first controller and the second controller detects that a fault occurs in one converter, driving of the other converter and the inverter is stopped.

SUMMARY

However, as in the technique disclosed in WO2014/013606, when a certain fault occurs (for example, an overvoltage is generated) in one converter, the other converter or the inverter also stops its operation. Accordingly, even when there is no problem in the other converter or the inverter, the whole system has to be stopped and thus there is a problem in that the system will not be able to operate efficiently.

Therefore, the disclosure provides a fuel cell system including a fuel cell and a battery in which the whole system can continue to operate even when an overvoltage is detected in one converter.

An aspect of the present disclosure relates to a fuel cell system including a fuel cell, a secondary battery, a first converter that is disposed between the fuel cell and a load, a second converter that is disposed between the secondary battery and the load, and a controller. The controller is configured to temporarily stop operation of the fuel cell system when an overvoltage is detected in one converter of the first converter and the second converter. The controller is configured to maintain a stopped state of the fuel cell system when an overvoltage is detected in another converter of the first converter and the second converter in a state in which the operation of the fuel cell system is temporarily stopped. The controller is configured to restart the operation of the fuel cell system when no overvoltage is detected in the other converter in the state in which the operation of the fuel cell system is temporarily stopped.

According to this aspect, when an overvoltage is generated in one converter but an overvoltage is not generated in the other converter, the system can continue to operate as a whole. Accordingly, in comparison with a case in the related art in which one converter also has to stop its operation when an abnormality of the other converter (occurrence of an overvoltage or the like) is recognized, it is possible to operate the system more efficiently.

The fuel cell system may further include a voltage detecting unit configured to detect a voltage of the one converter when no overvoltage is detected in the other converter in the state in which the operation of the fuel cell system is temporarily stopped. The controller may be configured to restart the operation of the fuel cell system using only an output of the other converter when a voltage of the one converter detected by the voltage detecting unit is higher than a predetermined value.

The first converter may be a fuel-cell converter including a first overvoltage detecting circuit. The second converter may be a battery converter including a second overvoltage detecting circuit. The controller may be configured to temporarily stop the operation of the fuel cell system when an overvoltage is detected in the fuel-cell converter by the first overvoltage detecting circuit. The controller may be configured to maintain the stopped state of the fuel cell system when an overvoltage is detected in the battery converter by the second overvoltage detecting circuit in the state in which the operation of the fuel cell system is temporarily stopped. The controller may be configured to restart the operation of the fuel cell system when no overvoltage is detected in the battery converter by the second overvoltage detecting circuit in the state in which the operation of the fuel cell system is temporarily stopped.

The fuel cell system may further include a voltage detecting unit configured to detect a voltage of the fuel-cell converter when no overvoltage is detected in the battery converter by the second overvoltage detecting circuit in the state in which the operation of the fuel cell system is temporarily stopped. The controller may be configured to restart the operation of the fuel cell system using only an output of the battery converter when a voltage of the fuel-cell converter detected by the voltage detecting unit is higher than a predetermined value. The controller may be configured to invalidate the first overvoltage detecting circuit and to restart the operation of the fuel cell system when the voltage of the fuel-cell converter detected by the voltage detecting unit is lower than the predetermined value.

The fuel cell system may further include a relay configured to control connection between the fuel-cell converter and the battery converter. The relay may be disposed between the fuel-cell converter and the battery converter. The controller may be configured to determine that an open-circuit fault occurs in the relay when the voltage of the fuel-cell converter detected by the voltage detecting unit is higher than the predetermined value.

According to the disclosure, in a fuel cell system including a fuel cell and a battery as power sources, it is possible to continuously cause the whole system to operate even when an overvoltage is detected in one converter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an overvoltage determination type table according to the embodiment.

DETAILED DESCRIPTION OF EMBODIMENTS

Embodiment

Figure 1:
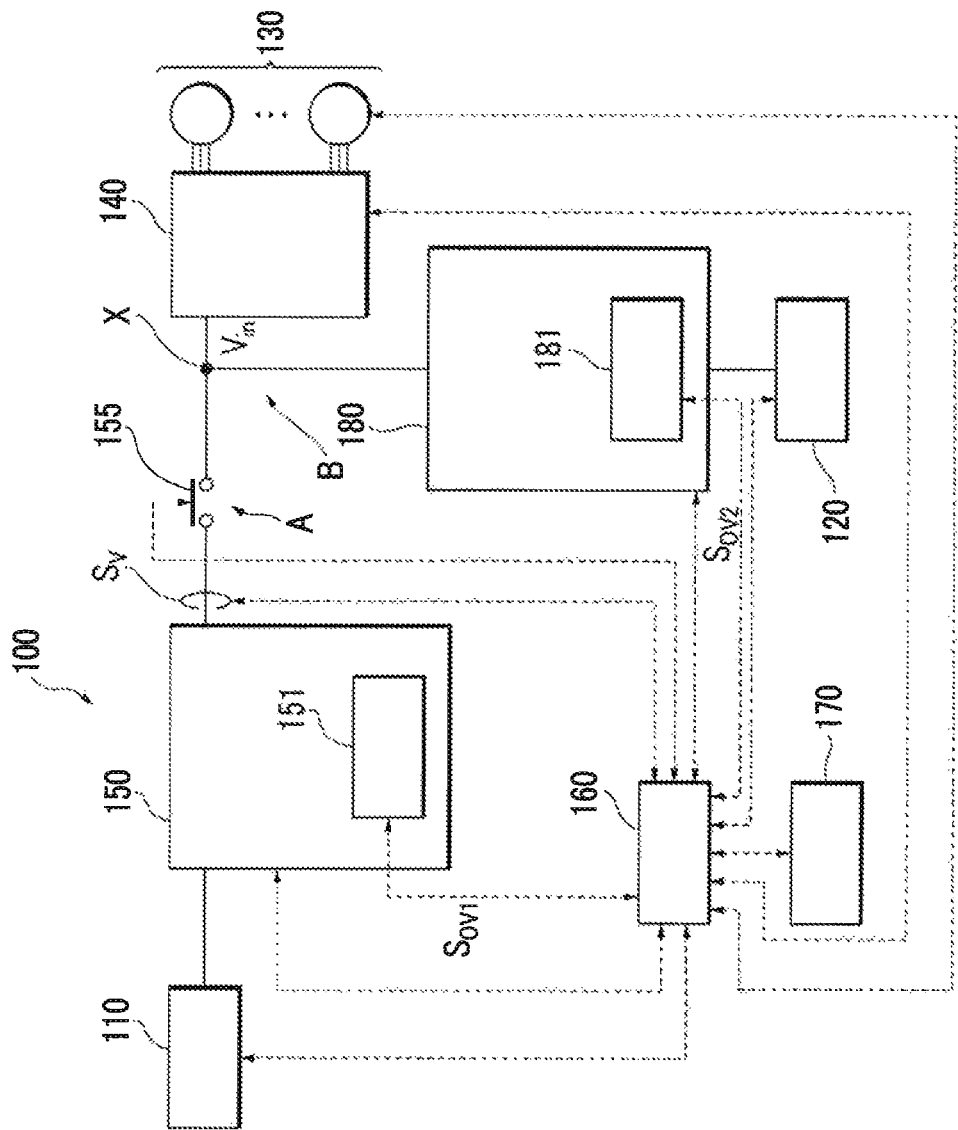
FIG. 1 is a diagram illustrating a configuration of a fuel cell hybrid vehicle (FCHV) system which is mounted in a vehicle according to an embodiment.

Hereinafter, a fuel cell system according to an embodiment of the disclosure will be described with reference to the accompanying drawings. In this embodiment, a fuel cell system according to the embodiment is used as an on-board power generation system (FCHV system) of a fuel cell vehicle (a fuel cell hybrid vehicle (FCHV)), but it can be applied to various moving objects (for example, a ship, an airplane, or a robot) in addition to a vehicle, a stationary power supply, or a portable fuel cell system.

An FCHV system 100 includes, for example, a polymer electrolyte type fuel cell 110 and a battery 120 as a power supply source for a load 130. The fuel cell 110 is a solid polymer electrolyte type cell stack in which a plurality of unit cells are stacked in series. The fuel cell 110 includes a channel for supplying fuel gas to an anode, a channel for supplying oxidant gas to a cathode, and a channel for supplying a coolant (none of which is illustrated), and can generate desired electric power by controlling an amount of supplied fuel gas or an amount of supplied oxidant gas in accordance with a control signal from a controller 160.

The fuel cell 110 and the load 130 are connected to each other via a power supply line A. In the power supply line A, a converter for a fuel cell (hereinafter referred to as a "fuel-cell converter") 150, a fuel-cell relay 155, and an inverter 140 are arranged sequentially from the fuel cell 110 side.

The fuel-cell converter 150 serves to control an output voltage of the fuel cell 110, and is a unidirectional voltage converter that steps up the output voltage of the fuel cell 110 which is input to an input side, that is, to the fuel cell 110 side, and outputs the stepped-up output voltage as an output voltage of the fuel-cell converter 150 to an output side, that is, to the inverter 140 side. Control is performed by the fuel-cell converter 150 such that the output voltage of the fuel cell 110 reaches a voltage corresponding to a target output. An overvoltage detecting circuit (hereinafter referred to as a "fuel-cell overvoltage detecting circuit") 151 and a voltage sensor Sv that detects an overvoltage on the output side of the fuel-cell converter 150 are provided on the output side of the fuel-cell converter 150. When an overvoltage on the output side of the fuel-cell converter 150 is detected, the fuel-cell overvoltage detecting circuit (a first overvoltage detecting circuit) 151 outputs a fuel cell overvoltage detection signal Sov1 to the controller 160.

A power supply line B is connected to the power supply line A. A connection point X of the power supply line A and the power supply line B is located between the fuel-cell converter 150 and the inverter 140. The battery 120 is connected to one end of the power supply line B, and a battery converter 180 is disposed between the battery 120 and the connection point X. The connection between the fuel-cell converter 150 and the battery converter 180 is switched between ON and OFF by the fuel-cell relay 155 under the control of the controller 160.

The battery 120 is connected to the load 130 in parallel with the fuel cell 110, and serves as a surplus power storage, a regenerative energy storage at the time of regenerative braking, and an energy buffer at the time of change of a load resulting from acceleration or deceleration of the fuel-cell vehicle. For example, a secondary battery such as a nickel-cadmium storage battery, a nickel-hydride storage battery, or a lithium secondary battery is used as the battery 120.

The battery converter 180 serves to control an output voltage of the battery 120 (an input voltage Vin of the inverter 140). An overvoltage detecting circuit (hereinafter referred to as a "battery overvoltage detecting circuit") 181 that detects an overvoltage on an output side of the battery converter 180 is provided on an output side of the battery converter 180. When the overvoltage on the output side of the battery converter 180 is detected, the battery overvoltage detecting circuit (a second overvoltage detecting circuit) 181 outputs a battery overvoltage detection signal Sov2 to the controller 160. The circuit configuration of the battery converter 180 may be the same configuration as the fuel-cell converter 150, but is not limited thereto and can employ any configuration as long as it can control the input voltage Vin of the inverter 140.

The inverter 140 is, for example, a PWM inverter that is driven in a pulse width modulation manner, converts DC power output from the fuel cell 110 and/or the battery 120 into three-phase AC power in accordance with a control command from the controller 160, and supplies the three-phase AC power to the load 130. Examples of the load 130 include an air compressor or a traction motor, but the load is not limited to the examples.

In this embodiment, although not illustrated in the drawing, an auxiliary motor that drives a hydrogen pump for recirculating exhaust gas containing hydrogen discharged from a hydrogen gas passage of the fuel cell 110 to the fuel cell 110, an auxiliary motor that drives a coolant pump for circulating a coolant used to adjust the temperature of the fuel cell 110, an auxiliary inverter that converts a direct current into a three-phase alternating current and supplies the three-phase alternating current to the auxiliary motors (none of which is illustrated), and the like are provided on a low voltage side (the battery 120 side) of the power supply line B.

Figure 2:
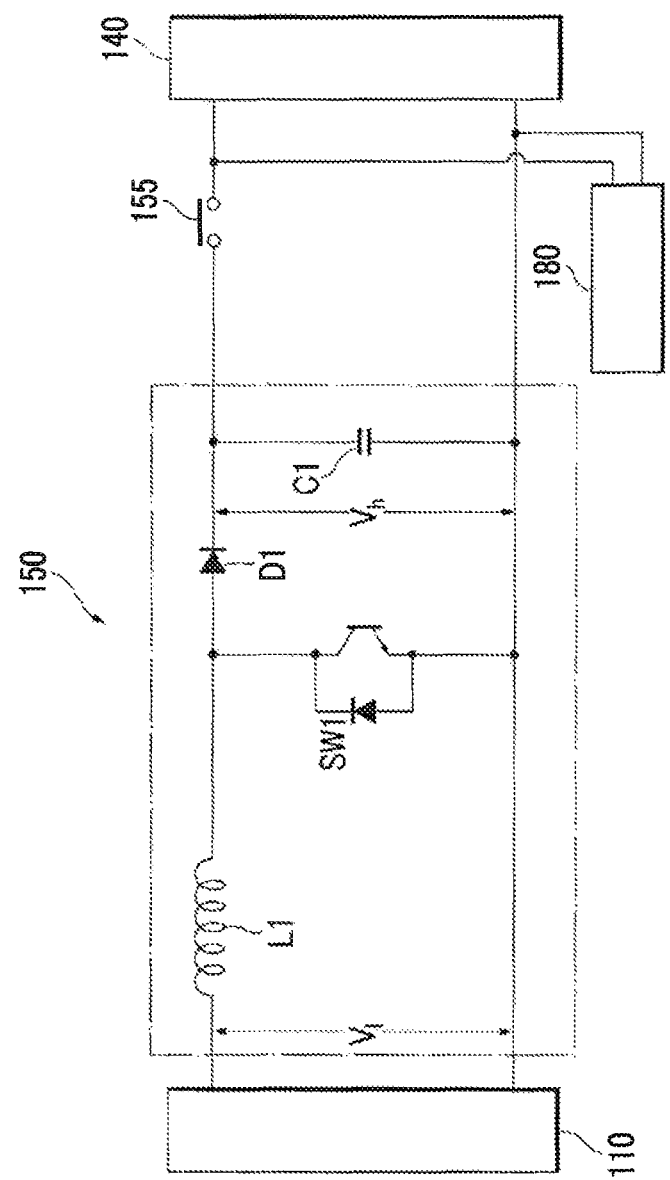
FIG. 2 is a diagram illustrating a circuit configuration of a principal circuit of a fuel-cell converter according to the embodiment.

FIG. 2 is a diagram illustrating a configuration of a principal circuit of the fuel-cell converter 150. In FIG. 2, for the purpose of convenience of description, a non-boosted voltage input to the fuel-cell converter 150 is defined as an input voltage V1, and a boosted voltage output from the fuel-cell converter 150 is defined as an output voltage Vh.

The fuel-cell converter 150 includes a reactor (an inductor) L1, a rectification diode D1, a switching element SW1 formed of an insulated gate bipolar transistor (IGBT), and a smoothing capacitor C1. One end of the reactor (the inductor) L1 is connected to an output terminal of the fuel cell 110, and the other end is connected to the collector of the switching element SW1. The switching element SW1 is connected between a power supply line of the inverter 140 and a ground line. Specifically, the collector of the switching element SW1 is connected to the power supply line and the emitter thereof is connected to the ground line. In this configuration, first, when the switching element SW1 is turned on, a current flows from the fuel cell 110 to the inductor L1, then to the switching element SW1, and the inductor L1 is excited by a direct current at this time and stores magnetic energy.

Subsequently, when the switching element SW1 is turned off, an induced voltage resulting from the magnetic energy stored in the inductor L1 is superimposed on the output voltage of the fuel cell 110 (that is, the input voltage V1 of the fuel-cell converter 150). An operating voltage (that is, the output voltage Vh of the fuel-cell converter 150) which is higher than the input voltage V1 smoothed by the capacitor C1 is output from the inductor L1 and an output current is output via the diode D1. The controller 160 acquires a desired output voltage Vh by appropriately changing a duty ratio of ON/OFF of the switching element SW1. When an open-circuit fault occurs in the fuel-cell relay 155 that connects the fuel-cell converter 150 and the battery converter 180, electric power of which an output destination has disappeared is stored in the capacitor C1 in the fuel-cell converter 150, and finally an overvoltage (a voltage higher than a rated voltage) is generated in the capacitor C1.

Referring back to FIG. 1, the controller 160 is a computer system for controlling the FCHV system 100 and includes, for example, a CPU, a RAM, and a ROM. The controller 160 receives inputs of various signals supplied from a sensor group 170 (for example, a signal indicating an accelerator pedal opening amount, a signal indicating a vehicle speed, and a signal indicating an output current or an output terminal voltage of the fuel cell 110) and calculates a required power for the load 130 (that is, a required power for the whole system).

The required power for the load 130 is, for example, a sum of vehicle-traveling power and auxiliary machine power. The auxiliary machine power includes electric power which is consumed in on-board auxiliary machines (such as a humidifier, an air compressor, a hydrogen pump, and a coolant circulation pump), electric power which is consumed in devices required for traveling a vehicle (such as a transmission, a vehicle wheel controller, a steering device, and a suspension device), and electric power which is consumed in devices disposed in an occupant space (such as an air conditioner, a lighting instrument, and an audio).

The controller 160 determines a distribution ratio of output power of the fuel cell 110 and the battery 120 and calculates a power generation command value. When required powers for the fuel cell 110 and the battery 120 are calculated, the controller 160 controls the operations of the fuel-cell converter 150 and the battery converter 180 such that the required powers are obtained.

The controller 160 according to this embodiment has an overvoltage determining function for the converters (the fuel-cell converter 150 and the battery converter 180). Specifically, when a fuel-cell overvoltage detection signal Sov1 is received from the fuel-cell overvoltage detecting circuit 151, the controller 160 determines that an overvoltage is generated on the output side of the fuel-cell converter 150. When an battery overvoltage detection signal Sov2 is received from the battery overvoltage detecting circuit 181, the controller 160 determines that an overvoltage is generated on the output side of the battery converter 180. When a voltage value V1 detected by a voltage sensor Sv which is disposed on the output side of the fuel-cell converter 150 is higher than a preset upper-limit voltage level Lmax, the controller 160 determines that an overvoltage is generated. A specific operation when the controller 160 determines an overvoltage will be described below in detail with reference to FIG. 3.

Figure 3:
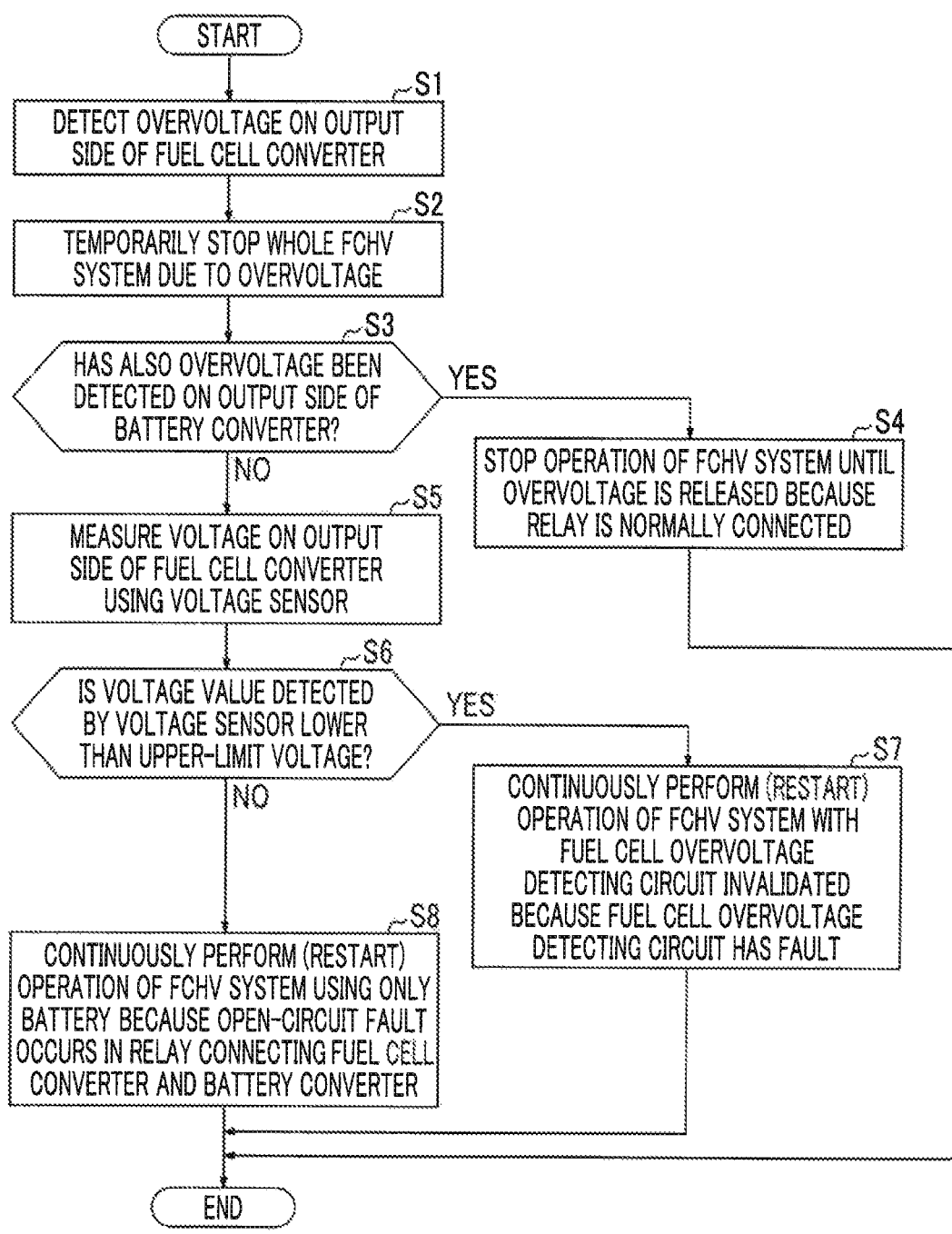
FIG. 3 is a flowchart illustrating an overvoltage determination control routine according to the embodiment.

FIG. 3 is a flowchart illustrating an overvoltage determination control process which is performed by the controller 160. When an overvoltage on the output side of the fuel-cell converter 150 is detected, the fuel-cell overvoltage detecting circuit 151 outputs a fuel-cell overvoltage detection signal Sov1 to the controller 160. When the fuel-cell overvoltage detection signal Sov1 is received, the controller 160 determines that an overvoltage is generated on the output side of the fuel-cell converter 150 (Step S1) and temporarily stops the FCHV system 100 as a whole (Step S2).

Then, the controller 160 also determines whether an overvoltage is generated on the output side of the battery converter 180 (Step S3). When a battery overvoltage detection signal Sov2 is received from the battery overvoltage detecting circuit 181, the controller 160 also determines that an overvoltage is generated on the output side of the battery converter 180 (YES in Step S3). In this way, when an overvoltage is detected in the same way by the overvoltage detecting circuits of both converters (that is, the fuel-cell overvoltage detecting circuit 151 and the battery overvoltage detecting circuit 181) connected to the inverter 140, the controller 160 determines that the relay (that is, the fuel-cell relay 155) interposed between the fuel cell 110 and the inverter 140 is normally connected, and maintains the stopped state of the operation of the FCHV system 100 until the overvoltage is released (Step S4).

On the other hand, when a battery overvoltage detection signal Sov2 is not received from the battery overvoltage detecting circuit 181 and it is determined that an overvoltage is not generated on the output side of the battery converter 180 (NO in Step S3), the controller 160 causes the routine to transition to Step S5. Then, the controller (the voltage detecting unit) 160 measures a voltage value V1 on the output side of the fuel-cell converter 150 using the voltage sensor Sv disposed on the output side of the fuel-cell converter 150. The controller 160 determines whether the voltage value V1 detected by the voltage sensor Sv disposed on the output side of the fuel-cell converter 150 is lower than a preset upper-limit voltage level Lmax (Step S6). When the voltage value V1 detected by the voltage sensor Sv is lower than the upper-limit voltage level Lmax (YES in Step S6), the controller 160 determines that a certain fault (an abnormality) occurs in the overvoltage detecting circuit (that is the fuel-cell overvoltage detecting circuit 151) disposed in the fuel-cell converter 150, invalidates the fuel-cell overvoltage detecting circuit 151, continuously performs (restarts) the operation (including traveling of the fuel cell vehicle) of the FCHV system 100 (Step S7), and ends the overvoltage determination control routine.

On the other hand, when the voltage value V1 detected by the voltage sensor Sv is higher than the upper-limit voltage level Lmax (NO in Step S6), the controller 160 determines that an open-circuit fault (an open fault) occurs in the fuel-cell relay 155 that connects the fuel-cell converter 150 and the battery converter 180, continuously performs the operation 6f the FCHV system 100 as a whole using only the battery 120 as the power source (Step S8), and ends the overvoltage determination control routine.

FIG. 4 is a diagram illustrating an overvoltage determination type table TB1 in which overvoltage determination results by the controller 160 are arranged. As illustrated in FIG. 4, the overvoltage determination results are classified into three types of Type1 to Type3.

Type1 represents a case in which an overvoltage is not actually generated, but it is determined that an overvoltage is generated in the fuel-cell converter 150 because the overvoltage detecting circuit of the fuel-cell converter 150 (the fuel-cell overvoltage detecting circuit 151) has a fault (Step S1→S2→S3→S5→S6→S7). In this case, since an overvoltage is not actually generated, the overvoltage detecting circuit of the fuel-cell converter 150 is invalidated and the operation of the FCHV system 100 as a whole is continuously performed.

Type2 represents a case in which an overvoltage is actually generated due to an open-circuit fault of the relay (the fuel-cell relay 155) connecting both converters and it is determined that an overvoltage is generated in the fuel-cell converter 150 (Step S1→S2→S3→S5→S6→S8). In this case, since an overvoltage is actually generated in the fuel-cell converter 150 but there is no abnormality in the power supply line B of the battery 120, the operation of the FCHV system 100 as a whole is continuously performed using only the battery 120 as the power source.

Type3 represents a case in which a fault in the relay (the fuel-cell relay 155) connecting both converters is not confirmed but generation of an overvoltage is recognized by the overvoltage detecting circuits of both converters (the fuel-cell overvoltage detecting circuit 151 and the battery overvoltage detecting circuit 181) (Step S1→S2→S3→S4). In this case, since an overvoltage is not actually generated in the fuel-cell converter 150 and the battery converter 180, the stopped state of the operation of the FCHV system 100 is maintained until the overvoltage is released.

As described above, according to this embodiment, when an overvoltage is generated in one converter (the fuel-cell converter 150 in the above-mentioned example) and an overvoltage is not generated in the other converter (the battery converter 180 in the above-mentioned example), it is possible to allow the whole system to operate continuously (see Type1 and Type2 in FIG. 4). Accordingly, in comparison with a case in the related art in which one converter also has to stop its operation when an abnormality of the other converter (occurrence of an overvoltage or the like) is recognized, it is possible to operate the system more efficiently.

When an overvoltage is generated in one converter (the fuel-cell converter 150 in the above-mentioned example) and an overvoltage is not generated in the other converter (the battery converter 180 in the above-mentioned example), it is possible to determine whether the reason for the occurrence of overvoltage is an open-circuit fault of the relay (the fuel-cell relay 155 in the above-mentioned example) connecting both converters or a fault of the overvoltage detecting circuit (the fuel-cell overvoltage detecting circuit 151 in the above-mentioned example) of one converter, and to perform system control suitable for the reason of fault.

In the embodiment, a pattern in which one converter is the fuel-cell converter 150 and the other converter is the battery converter 180 is employed, but an inverted pattern may be employed. That is, a pattern in which one converter is the battery converter 180 and the other converter is the fuel-cell converter 150 may be employed. In the embodiment, an overvoltage generated in the fuel-cell converter 150 is first detected, but the same is true when an overvoltage generated in the battery converter 180 is first detected. The disclosure can be applied to various systems including two or more converters.

What is claimed is:

1. A fuel cell system comprising:
   a fuel cell;
   a secondary battery;
   a first converter that is disposed between the fuel cell and a load;
   a second converter that is disposed between the secondary battery and the load; and
   a processor programmed to:
      i) temporarily stop operation of the fuel cell system when an overvoltage is detected in one converter of the first converter and the second converter;
      ii) maintain a stopped state of the fuel cell system when an overvoltage is detected in another converter of the first converter and the second converter in a state in which the operation of the fuel cell system is temporarily stopped; and
      iii) restart the operation of the fuel cell system when no overvoltage is detected in the other converter in the state in which the operation of the fuel cell system is temporarily stopped.

2. The fuel cell system according to claim 1, further comprising a voltage detecting unit configured to detect a voltage of the one converter when no overvoltage is detected in the other converter in the state in which the operation of the fuel cell system is temporarily stopped, wherein the processor controller is further programmed to restart the operation of the fuel cell system using only an output of the other converter when a voltage of the one converter detected by the voltage detecting unit is higher than a predetermined value.

3. The fuel cell system according to claim 1, wherein:
   the first converter is a fuel-cell converter including a first overvoltage detecting circuit;
   the second converter is a battery converter including a second overvoltage detecting circuit; and
   the processor is further programmed to:
      i) temporarily stop the operation of the fuel cell system when an overvoltage is detected in the fuel-cell converter by the first overvoltage detecting circuit;
      ii) maintain the stopped state of the fuel cell system when an overvoltage is detected in the battery converter by the second overvoltage detecting circuit in the state in which the operation of the fuel cell system is temporarily stopped; and
      iii) restart the operation of the fuel cell system when no overvoltage is detected in the battery converter by the second overvoltage detecting circuit in the state in which the operation of the fuel cell system is temporarily stopped.

4. The fuel cell system according to claim 3, further comprising a voltage detecting unit configured to detect a voltage of the fuel-cell converter when no overvoltage is detected in the battery converter by the second overvoltage detecting circuit in the state in which the operation of the fuel cell system is temporarily stopped, wherein:
   the processor is further programmed to restart the operation of the fuel cell system using only an output of the battery converter when a voltage of the fuel-cell converter detected by the voltage detecting unit is higher than a predetermined value; and the processor is further programmed to invalidate the first overvoltage detecting circuit and to restart the operation of the fuel cell system when the voltage of the fuel-cell converter detected by the voltage detecting unit is lower than the predetermined value.

5. The fuel cell system according to claim 4, further comprising a relay configured to control connection between the fuel-cell converter and the battery converter, the relay being disposed between the fuel-cell converter and the battery converter, wherein the processor is further programmed to determine that an open-circuit fault occurs in the relay when the voltage of the fuel-cell converter detected by the voltage detecting unit is higher than the predetermined value.

* * * * *